… … …

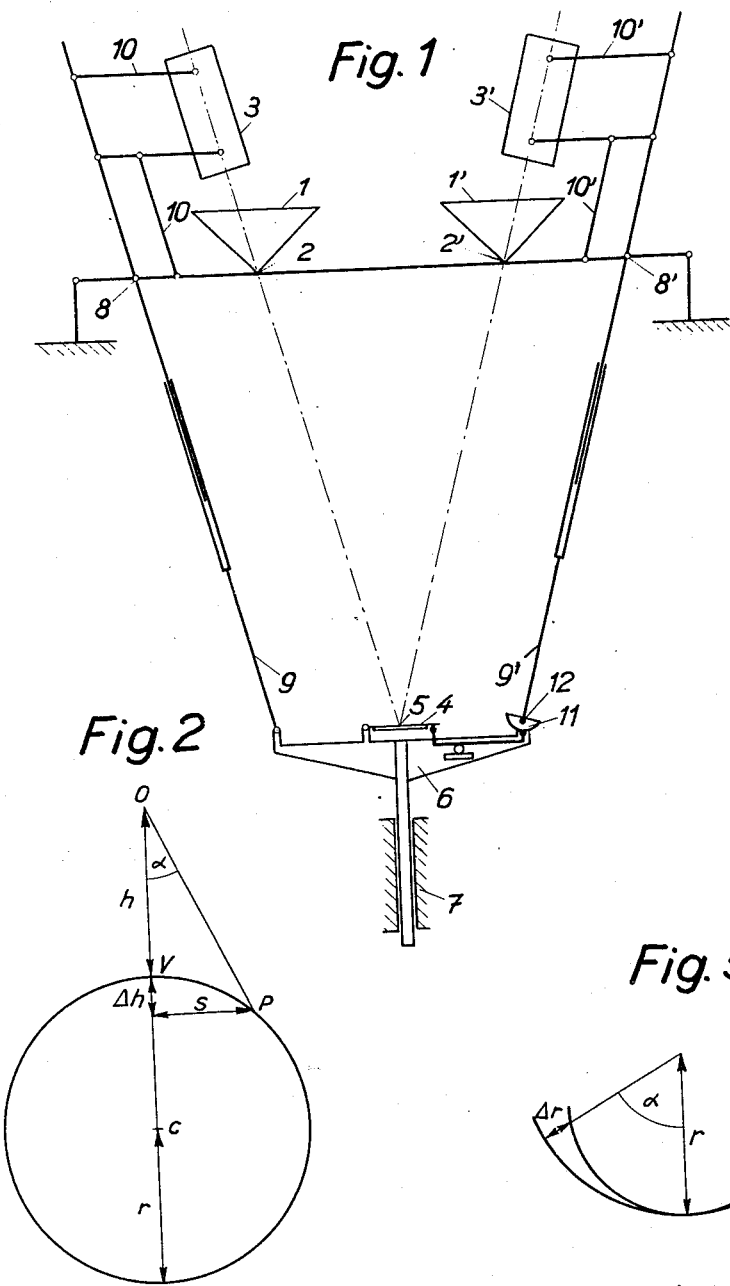

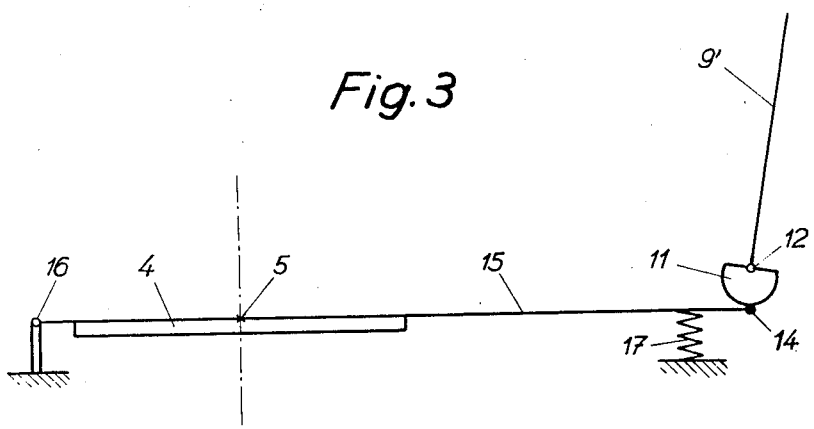
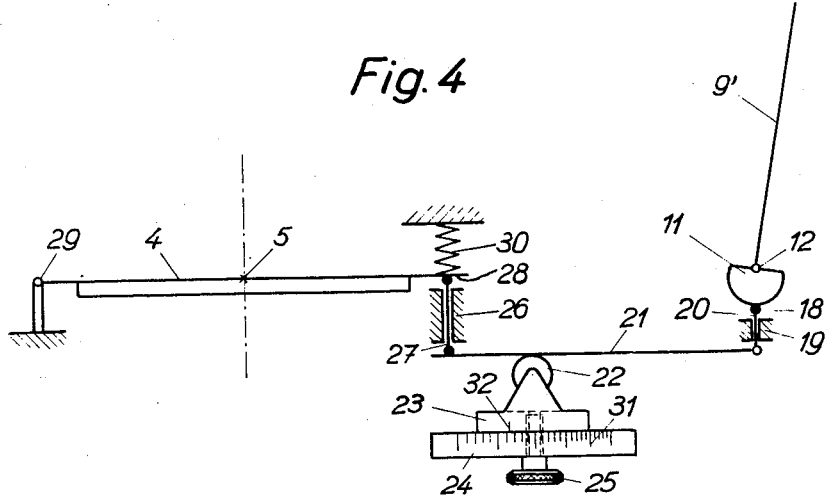

United States Patent Office 3,060,798
Patented Oct. 30, 1962

3,060,798
STEREOPHOTOGRAMMETRICAL PLOTTING APPARATUS
Henk Yzerman, 62 Alpenzeigerweg, Aarau, Switzerland
Filed Nov. 25, 1959, Ser. No. 855,328
Claims priority, application Switzerland Nov. 27, 1958
1 Claim. (Cl. 88—24)

The invention relates to stereophotogrammetrical plotting apparatus, in which a pair of photographs of a section of the surface of the earth provided in stereometrical relation produce images which are suitable for stereoscopic viewing and from which measurements can be made and a map can be plotted. These instruments are generally known and are, for example, described in U.S. patent specifications Nos. 2,492,870 and 2,552,975. In these constructions, the two photographs are projected into a common plane, means being provided by which the photographs are moved to a relative position corresponding exactly to that in which the photographs were taken. Means for stereoscopic viewing of the two photographs are also provided. The construction and functions of these instruments are known and, unless they are directly related to the invention, are, therefore, not described in detail in the description below.

In all of these plotting apparatus it is impossible to avoid certain distortions of the photographs which may be due to various reasons as, for example, the properties of the photographic and projecting lenses used, atmospheric refraction, and the like. Means for the compensation of distortions due to the properties of the photographic and projecting lenses used are known and are, for example, described in U.S. Patent specifications Nos. 2,552,975 and 2,727,432. All of these means produce a change in the inner orientation of the plotting camera. More recently, photographic and projecting lenses having only a minute distortion have been developed. The residual distortion causes a minute model deformation, an approximate representation of which can generally be provided by a spherical surface hereinafter referred to as the "spherical model formation." Distortions due to atmospheric refraction can be largely linearized and reduced by corresponding correction of the camera constant.

The spherical model formation produced in the plotting apparatus hereinbefore referred to is, however, chiefly due to the curvature of the earth and is, therefore, not a distortion as is frequently assumed, but merely a natural replica of the photographed section of the earth surface which, in principle, has no relation to the inner orientation of the plotting camera. The present invention has among its objects to compensate this spherical model formation.

The invention relates to a device for the compensation of the spherical model formation in stereophotogrammetrical plotting apparatus, in which the condenser systems by which the photographs are illuminated are controlled by guide rods mounted on gimbals parallel to their optical axes in such manner that their optical axes always intersect in the measuring mark, and according to the invention the measuring table with the measuring mark is mounted, as for example, on a lever, one end of which is mounted in a stationary bearing provided on the support of the measuring table and the other end of which is directly or indirectly controlled by one of the guide rods through a body having a nonspherical surface in such manner that the compensation of the spherical model formation is automatically effected during the movement of the guide rod by tilting the lever with the measuring table and the measuring mark. The tilt of the lever $\Delta h$ may be calculated in accordance with the approximation equation $$\Delta h = \frac{h^2}{2r} \cdot \tan^2 \alpha$$

where:
$h$ = the distance from a projecting lens to the spherical model formation
$r$ = the radius of the spherical model formation
$\alpha$ = half the angle subtended at the projecting lens by the chord of the spherical model formation corresponding to the correction.

It is an advantage that with apparatus according to the invention the spherical model formation can be compensated more advantageously by means of simpler and less sensitive structural parts than is possible with plotting apparatus of known construction. Certain other model formations due to residual distortions of the photographic and projecting lenses, and residual distortions due to atmospheric refraction may also be compensated.

The plotting camera of plotting apparatus provided with the device according to the invention can be of a simpler and thus a more robust construction than that of similar plotting apparatus provided with other known compensating devices. The increased stability of the plotting camera facilitates control thereof independently of the remaining parts of the plotting apparatus. During plotting of the photographs the inner orientation of the plotting camera remains unchanged so that the reliability of the plotting is increased.

One construction according to the invention, a modification thereof, and the geometrical relations necessary to illustrate the invention are diagrammatically illustrated by way of example in the drawings, in which:

FIGURE 1 shows the essential parts of a plotting apparatus and the device for compensating the spherical model formation;
FIGURE 2 shows the geometrical relations on the model supplied by the plotting camera of the plotting apparatus;
FIGURE 3 shows the simplest construction of the device for compensating the spherical model formation;
FIGURE 4 illustrates a detail of the device shown in FIG. 1; and
FIGURE 5 is a partial geometrical illustration of such a device.

In FIGURE 1, 1 and 1' denote the two photographs, 2 and 2' the two projecting lenses, 3 and 3' the two condenser systems, 4 the measuring table, 5 the measuring mark, and 6 the support of the measuring table mounted on a sliding carriage 7. Two telescopic guide rods 9 and 9' respectively mounted on gimbals 8 and 8' parallel to the optical axes of the condenser systems 3 and 3' are effective to control the condenser systems 3 and 3' through articulated parallelograms 10 and 10' in such manner that the optical axes of the two condenser systems 3 and 3' always intersect in the measuring mark 5.

In FIGURE 2, O denotes a projecting lens of the plotting camera, and $h$ is the perpendicular to the spherical model formation, the nadir of the perpendicular being denoted by V. The point P in the angle $\alpha$ of the perpendicular is disposed on the spherical model formation. S is the horizontal, and $\Delta h$ is the vertical distance between the point P and the nadir V of the perpendicular $h$. $r$ is the radius of the spherical model formation. Since $\Delta h$ is small in comparison with $h$ and $r$ the relation $$\Delta h = \frac{h^2}{2r} \cdot \tan^2 \alpha$$

gives a photogrammetric plotting of adequate accuracy.

The amount by which the level of the measuring mark 5 should be corrected to obtain a compensation of the spherical model formation corresponds to the magnitude of $\Delta h$. This compensation is automatically produced by means of the following device:

On the end of the guide rod 9' mounted on gimbals remote from the condenser system, there is mounted so as to be replaceable, a body 11 having a non-spherical surface and mounted on gimbals 12 on the support 6 of the measuring table 4. The deviation of the non-spherical surface of the body 11 from a spherical surface 13 having the radius r is chosen so that the value of the deviation $\Delta r$ is proportional to $\tan^2 \alpha$ (FIGURE 5).

It has been found advantageous to introduce into the relation: "$\Delta r$ proportional to $\tan^2 \alpha$," a dimension such that an equation $\Delta r = 2 \tan^2 \alpha$ mm. results therefrom. For $\alpha = 45°$, this equation produces a value of $\Delta r$ equal to 2 mm.

The body 11 with its non-spherical surface controls a ball 14 secured to the free end of a lever 15, the other end of which is mounted in a bearing 16 which is stationary with respect to the support 6 of the measuring table 4. The measuring table 4 with the measuring mark 5 is mounted on the lever 15. A spring acting on the lever 15 is provided in order to ensure that the ball 14 is always held against the non-spherical surface of the body 11.

As previously stated, the level of the measuring mark 5 on the measuring table 4 is corrected by tilting the guide rod 9' to the extent of $$\Delta h = \frac{h^2}{2r} \cdot \tan^2 \alpha$$

where h and r are constant for a specific model, but vary for different models. It is, therefore, necessary that a body 11 having a corresponding non-spherical surface should be available for each combination of the magnitudes h and r so that upon plotting a pair of images the spherical model formation is automatically compensated in accordance with the equation $$\Delta h = \frac{h^2}{2r} \cdot \tan^2 \alpha$$

It will be understood that since h and r are constant for a specific model but vary for various models it will be necessary in plotting different models for parts of the device to be replaced. This, however, can be avoided by constructing the device as illustrated in FIGURE 4.

In this construction the body 11 having a non-spherical surface is secured to the end of the guide rod 9'. The non-spherical surface of the body 11 acts on a ball 18, which is secured to the upper end of a vertical tappet 20 guided in a slide 19. One end of a lever 21 which rests on a roller 22 is pivotally connected to the lower end of the tappet 20. The roller 22 is mounted on a sliding carriage 23, which is displaceable in a slide 24 and adapted to be clamped in position by means of a setscrew 25. The other end of the lever 21 carries the lower end of a vertical tappet 27 guided in a slide 26, the upper end of the tappet 27 acting on one end of a lever 28 which is mounted in a bearing 29 and on which the measuring table 4 with the measuring mark 5 is mounted. A spring 30 is effective to ensure that the tappet 27 remains constantly in contact with the levers 28 and 21, and that the tappet 20 with its ball 18 is constantly held against the non-spherical surface of the body 11. Upon displacement of the tappet 20, the lever 21 linked thereto is rotated about its point of support on the roller 22 and is thus effective to displace the tappet 27, which, in turn, tilts the lever 28 with the measuring table 4 and the measuring mark 5.

The transmission ratio corresponding to a given model is adjusted by displacement of the sliding carriage 23 with the roller 22 on the slide 24, and for this purpose the slide 24 has a scale 31 and the slide 23 has an index 32.

The body 11 having a non-spherical surface may also be mounted on the lever 15 or 21 respectively. In this case, its non-spherical surface is controlled by an extension of the guide rod 9'.

I claim:

In a stereophotogrammetrical plotting apparatus having two condenser systems with which photographs are illuminated for purpose of reproduction thereof, which condenser systems are controlled by guide rods respectively mounted on gimbals parallel to the optical axis of the respective condenser system so that the optical axes of the two systems always intersect in a measuring mark, an arrangement for the compensation of the spherical model formation, comprising: a one arm lever pivotally supporting a measuring table with the measuring mark thereon; a first vertical tappet engaging with its upper end the arm of said lever from below; means for guiding said tappet; a double arm lever, one arm thereof engaging the lower end of said first tappet; a second tappet on the other arm of said double arm lever; means for guiding said second tappet for vertical movement upon tilting of said double arm lever; a ball on top of said second tappet; a non-spherical surface on the lower end of one of said rods and engaging said ball; a roller with sliding carriage disposed to adjustably define the pivot point of said double arm lever; means for arresting the position of said carriage; and a spring acting against said one arm lever so as to urge said second tappet with ball against said non-spherical surface via said first tappet and said double arm lever.

References Cited in the file of this patent

UNITED STATES PATENTS 2,492,870 Kelsh _____ Dec. 27, 1949
2,833,178 Kelsh _____ May 6, 1958